United States Patent
Rodriguez

(10) Patent No.: US 12,489,547 B2
(45) Date of Patent: Dec. 2, 2025

(54) FLEXIBLE MODULATION AND CODING SCHEME AUDIO SYSTEM

(71) Applicant: Shure Acquisition Holdings, Inc., Niles, IL (US)

(72) Inventor: Michael Rodriguez, Arlington Heights, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 785 days.

(21) Appl. No.: 17/445,788

(22) Filed: Aug. 24, 2021

(65) Prior Publication Data

US 2022/0060278 A1 Feb. 24, 2022

Related U.S. Application Data

(60) Provisional application No. 63/069,462, filed on Aug. 24, 2020.

(51) Int. Cl.
*H04L 1/00* (2006.01)
*H04R 3/00* (2006.01)
(Continued)

(52) U.S. Cl.
CPC .......... *H04L 1/0017* (2013.01); *H04L 1/0009* (2013.01); *H04R 3/005* (2013.01);
(Continued)

(58) Field of Classification Search
None
See application file for complete search history.

(56) References Cited

U.S. PATENT DOCUMENTS 6,366,326 B1 4/2002 Ozkan
6,456,627 B1 9/2002 Frodigh
(Continued)

FOREIGN PATENT DOCUMENTS

CN 104507112 4/2015
CN 108010533 5/2018
(Continued)

OTHER PUBLICATIONS

Kovacevic, et al., "Joint Coding Rate Control for Audio Streaming in Short Range Wireless Networks," IEEE Transactions on Consumer Electronics, Jun. 2009, 7 pp.
(Continued)

*Primary Examiner* — Jeffrey M Rutkowski
*Assistant Examiner* — Mehedi S Aley
(74) *Attorney, Agent, or Firm* — Banner & Witcoff, Ltd.

(57) ABSTRACT

A wireless microphone system is disclosed. The system includes a plurality of wireless microphones each classified in accordance with one or more audio quality parameters. The system also includes a control device communicatively coupled to the plurality of wireless microphones. The control device is configured to determine that a first wireless microphone corresponds to a first audio classification, and that a second wireless microphone corresponds to a second, different, audio classification. The control device is also configured to determine a first modulation and coding scheme for the first wireless microphone based on the first audio classification, and a second modulation and coding scheme for the second wireless microphone based on the second audio classification. The control device is further configured to transmit, to the first and second wireless microphones respectively, the determined first and second modulation and coding schemes.

19 Claims, 5 Drawing Sheets

(51) Int. Cl.
*H04W 24/02* (2009.01)
*H04W 28/20* (2009.01)
*H04W 28/22* (2009.01)
*H04W 48/16* (2009.01)

(52) U.S. Cl.
CPC .......... *H04W 24/02* (2013.01); *H04W 28/20* (2013.01); *H04W 28/22* (2013.01); *H04W 48/16* (2013.01); *H04R 2420/07* (2013.01)

(56) References Cited

U.S. PATENT DOCUMENTS

| | | | |
|---|---|---|---|
| 7,885,225 B2 | 2/2011 | Ishii | |
| 8,082,050 B2 | 12/2011 | Schmidt | |
| 8,229,435 B2 | 7/2012 | Youn | |
| 8,289,952 B2 | 10/2012 | Larsson | |
| 8,374,101 B2 | 2/2013 | Li | |
| 8,873,451 B2 | 10/2014 | Al | |
| 8,982,803 B1 | 3/2015 | Zhang | |
| 9,071,913 B2 | 6/2015 | Koch | |
| 9,155,080 B2 | 10/2015 | Kim | |
| 10,313,051 B2 | 6/2019 | Greenberg | |
| 10,447,616 B2 | 10/2019 | Sinha | |
| 2006/0268837 A1* | 11/2006 | Larsson | H04L 1/0014 370/352 |
| 2007/0066242 A1 | 3/2007 | Yi | |
| 2008/0013749 A1* | 1/2008 | Konchitsky | H04R 1/406 381/94.7 |
| 2012/0320858 A1 | 12/2012 | Maru | |
| 2014/0245359 A1* | 8/2014 | De Foy | H04W 36/14 725/62 |
| 2017/0134988 A1 | 5/2017 | Liu | |
| 2018/0091959 A1* | 3/2018 | Sun | H04W 52/262 |
| 2018/0192387 A1* | 7/2018 | Jung | H04W 56/0005 |
| 2018/0241679 A1* | 8/2018 | Muscariello | H04L 43/0858 |
| 2019/0260495 A1* | 8/2019 | Nammi | H04L 1/0016 |
| 2020/0014488 A1* | 1/2020 | Lyu | H04L 1/0026 |
| 2020/0090672 A1 | 3/2020 | Petersen | |
| 2022/0360461 A1* | 11/2022 | Raleigh | H04W 52/0264 |
| 2023/0300532 A1* | 9/2023 | Spittle | G06F 3/165 381/1 |

FOREIGN PATENT DOCUMENTS

| | | | |
|---|---|---|---|
| CN | 108028724 | 5/2018 | |
| DE | 102009046544 | 5/2011 | |
| DE | 102009046544 A1 * | 5/2011 | ............ H04B 7/00 |
| EP | 2659716 | 11/2013 | |
| JP | 2679483 | 11/1997 | |
| WO | 2012088579 | 7/2012 | |
| WO | 2019072206 | 4/2019 | |

OTHER PUBLICATIONS

LTE Evolved Multimedia Broadcast Multicast Services (eMBMS), Product Specification, Viavi Solution Inc., 2015, 16 pp.
Universal Mobile Telecommunications System (UMTS), Study on Improved Video Coding Support, ETSI TR 126 904, Version 10.0.0, Release 10, Apr. 2011, 87 pp.
Appdhaba Technologies, Stereo Audio Recorder, obtained from website https://play.google.com/store/apps/details?id=com.appdhaba.crosstalk&hl=en&gl=US on Dec. 15, 2021, 4 pp.
International Search Report and Written Opinion for PCT/US2021/071266 dated Nov. 30, 2021, 17 pp.
Apr. 1, 2025—(EP) Office Action—App E21770407.1.

* cited by examiner

FLEXIBLE MODULATION AND CODING SCHEME AUDIO SYSTEM

CROSS-REFERENCE

This application claims priority to U.S. Provisional Patent Application No. 63/069,462, filed on Aug. 24, 2020, the contents of which are incorporated herein by reference in their entirety.

TECHNICAL FIELD

This application generally relates to a wireless microphone system that can include a plurality of microphones and a control device. In particular, this application relates to a wireless microphone system wherein different modulation and coding schemes can be assigned to different wireless microphones based on various characteristics, including a classification of each wireless microphone.

BACKGROUND

Audio production can involve the use of many components, including microphones, wireless base stations or control devices, recorders, and/or mixers for capturing, recording, and presenting the sound of productions, such as television programs, newscasts, movies, live events, and other types of productions.

Communication between various devices of the audio system include various parameters, including a modulation and coding scheme (MCS), audio bit rate, channel bandwidth, and more. In general, the MCS of a given communication link is directly related to the capacity (i.e., bit rate) and performance (i.e., bit error rate) of the link. A higher MCS transmits at a higher bit rate and is decoded at a higher bit error rate, relative to a lower MCS. For example, a 16-QAM scheme with rate 3/4 coding is a higher MCS than a 16-QAM scheme with rate 1/2 coding. As another example, a 16-QAM scheme with rate 1/2 coding is a higher MCS than a QPSK scheme with rate 1/2 coding. Typically, these parameters (e.g., MCS, audio bit rate, channel bandwidth, etc.) are fixed so that the performance will be identical for the communication links for different audio users of the system (assuming the channel conditions are the same). These typically fixed parameters make it difficult or impossible to make system tradeoffs, such as trading off system capacity vs. link performance, system capacity vs. perceived audio quality, and more.

Accordingly, there is an opportunity for a wireless audio system that meets the requirements for an audio system (e.g., minimal latency and low packet error rate), while also providing the flexibility to make tradeoffs in system capacity, link performance, range, and perceived audio quality.

SUMMARY

Embodiments of the present disclosure are intended to solve or assist in solving the above-noted problems by providing an audio system in which the MCS for various wireless microphones in the system can be different, to enable optimization of the system as a whole.

In an embodiment, a wireless microphone system includes a plurality of wireless microphones each classified in accordance with one or more audio quality parameters. The wireless microphone system also includes a control device communicatively coupled to the plurality of wireless microphones. The control device is configured to determine that a first wireless microphone of the plurality of wireless microphones corresponds to a first audio classification, and determine that a second wireless microphone of the plurality of wireless microphones corresponds to a second audio classification that is different than the first audio classification. The control device is also configured to determine a first modulation and coding scheme for the first wireless microphone based on the first audio classification, determine a second modulation and coding scheme for the second wireless microphone based on the second audio classification, and transmit, to the first and second wireless microphones respectively, the determined first and second modulation and coding schemes.

In a second embodiment, a wireless microphone system includes a plurality of wireless microphones each classified in accordance with one or more audio quality parameters. The wireless microphone system also includes a control device communicatively coupled to the plurality of wireless microphones. The control device is configured to determine environmental audio quality parameters for at least one of the plurality of wireless microphones, determine a modulation and coding scheme for the at least one of the plurality of wireless microphones based on its classification or its environmental audio quality parameters, and transmit, to the at least one of the plurality of wireless microphones, the determined modulation and coding scheme.

In a third embodiment, a method of operating a wireless microphone system is disclosed.

In a fourth embodiment, a non-transitory, computer readable memory has instructions stored thereon that, when executed by a processor, cause the performance of a set of acts. The set of acts includes various functions or actions related to the wireless microphone systems described herein.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
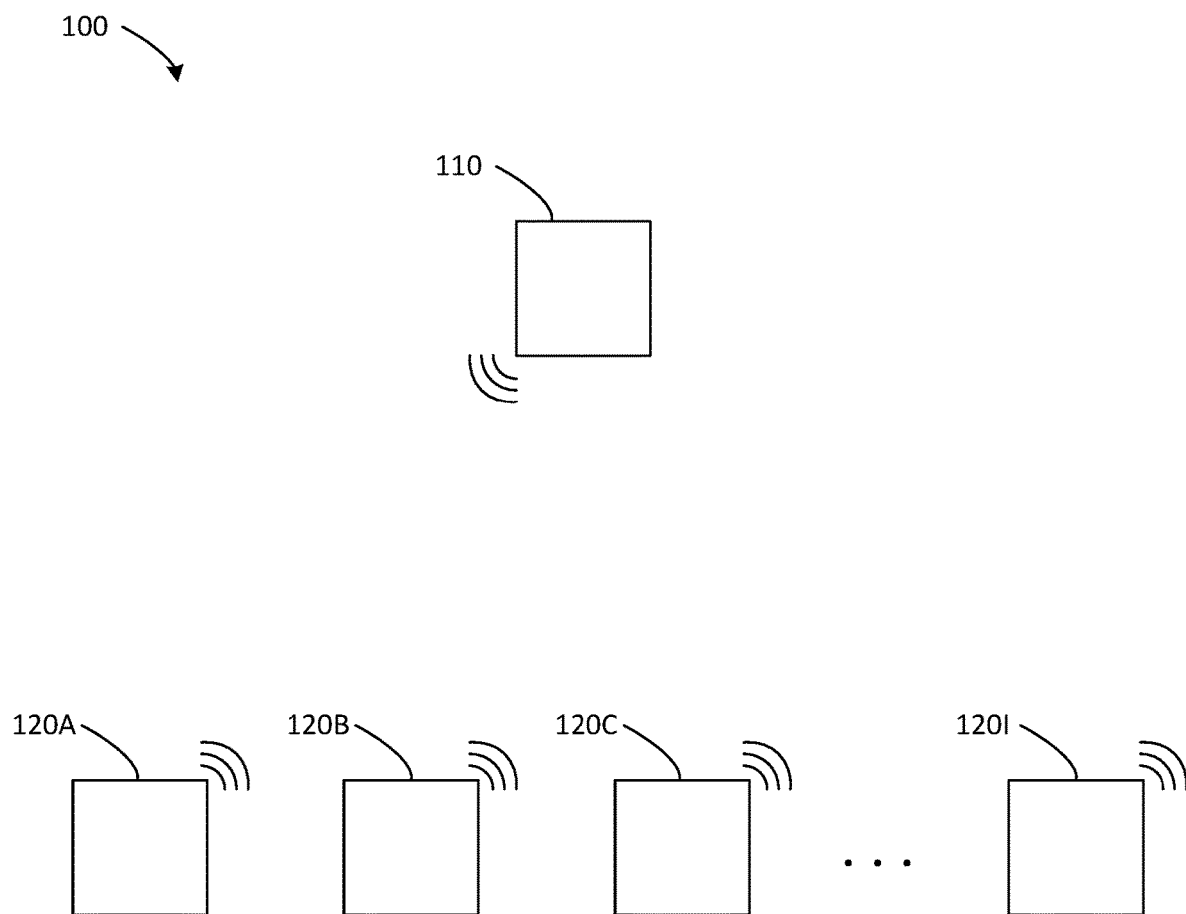
FIG. 1 is a schematic diagram of a wireless microphone system, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The wireless microphone systems described herein may be wireless multi-channel audio systems, which may enable greater packing of audio communication links into the RF spectrum relative to wireless narrowband audio systems. In wideband systems, a single RF carrier supports multiple audio users. The wideband audio system is then constrained by the bandwidth of the (wideband) RF carrier rather than the bandwidth of the individual audio channels. The audio channel capacity of the wireless multi-channel audio system is partially determined by how efficiently the system can multiplex the users onto that single wideband RF carrier.

In addition to the differences noted above, wideband multi-user audio systems may have more flexibility than traditional narrowband systems. For instance, the wideband system can enable a mix of different audio devices, types, and classification to coexist within a single wideband carrier (e.g., voice grade vs. high fidelity, mono vs. stereo). Further, each audio channel within the wideband carrier can have different parameters (e.g. MCS, bit rate) based on their individual requirements, individual environmental conditions, classifications, and more.

By allowing the parameters of the individual users to vary, the system can maximize the audio channel capacity of the wideband carrier given the performance requirements of the individual users and the system as a whole. In particular, example wireless microphone systems of the present disclosure have the ability to assign a particular modulation and coding scheme (MCS) for a communication link between each wireless microphone and a control device. Being able to assign a particular MCS to each microphone individually can allow the capacity of the audio system to be optimized for a particular set of users, application, and/or environment.

For example, a given wireless microphone system might have a nominal capacity of N audio channels at a given MCS for a nominal range. A wireless microphone system of the present disclosure may implement a high-density mode by using a higher MCS. In this case, more than N audio channels would fit in the wideband carrier, at the expense of reduced range (or a higher bit error rate). Conversely, if a more reliable audio link is desired, a lower MCS could be used, at the expense of reduced audio capacity.

In the wireless microphone systems of the present disclosure, various tradeoffs can be made. For example, a higher MCS for one or more of the wireless microphones can result in greater density, and therefore a greater audio capacity or user capacity, at the expense of an increased bit error rate. Additionally, some systems may trade off audio quality (i.e., a higher source bit rate) vs. user capacity (spectral efficiency). Further systems may trade off range vs. user capacity, and range vs. audio quality.

In various wireless microphone systems of the present disclosure, relevant audio parameters and tradeoffs can include the audio codec bit rate, MCS, and bandwidth (or number of subcarriers for a given microphone), among others.

Regarding the bit rate in particular, a higher bit rate may increase the perceived audio quality for a given wireless microphone. As such, if the quality for a given microphone is too low, the bit rate may be increased. Conversely, if the perceived audio quality is high, and can be reduced without any adverse effects, the bit rate may be decreased to provide flexibility to other parameters (e.g., MCS, bandwidth, and more).

The bit rate may have an inverse relationship with respect to spectral efficiency, density, and/or user capacity of the system. As such, when the bit rate is increased, spectral efficiency may decrease. In some examples, the audio bit rate of the individual audio channels can be modified to optimize overall system capacity. This capability could be used to create classes of users based on their requirements for audio quality. Rather than assigning each user the bit rate (and therefore bandwidth) needed for the highest quality audio, system capacity may be optimized by assigning a bit rate to each user based on its individual requirement for audio quality. For example, voice grade users may be assigned lower bit rates and therefore lower bandwidth relative to high fidelity audio users. This can enable a greater number of users to exist on the same system bandwidth.

In some examples, the source bit rate (different from the audio bit rate) is fixed. This enables the bandwidth per audio channel or user to scale along with the MCS for that channel (i.e., a higher MCS has a lower bandwidth, since the same amount of bits can be transmitted using less bandwidth). Example systems may be designed to maintain a target bit error rate (or maintain operation within a target bit error rate range). As a consequence, in order to remain within the target bit error rate range, when a given user moves to a higher or lower available MCS, the operable distance (or range) of the microphone changes as well. A higher MCS may correspond to a lower operable distance or range, and vice versa.

Regarding the MCS for each wireless microphone, example systems of the present disclosure are designed such that using a higher MCS is more spectrally efficient. A higher MCS is able to transmit the same amount of audio information using a smaller bandwidth (i.e., fewer subcarriers), meaning that more users can be supported by the same amount of overall system bandwidth. Additionally, using a higher MCS can cause a lower operable distance (or range) for a given packet error rate of a wireless microphone. Or equivalently, a higher MCS can cause a higher packet error rate for a given signal to noise ratio (SNR).

Regarding the bandwidth (or number of subcarriers) for a given wireless microphone, allocating more subcarriers to a user enables a higher audio bit rate for a given MCS. In some examples, a fixed source bit rate is transmitted for a given wireless microphone, meaning that the bandwidth per audio channel scales as the MCS is changed. A higher MCS can be used to pack more audio channels within a wideband RF carrier. However, since wireless audio systems of the present disclosure may be designed to meet a target audio bit error rate, increasing the MCS of one or more wireless microphones while maintaining operation within the target bit error rate range causes the operable distance or range of one or more of the wireless microphones to decrease accordingly. As such, in some examples the number of subcarriers may be set during a configuration process, resulting in a fixed capacity of the system. In this case, increasing or decreasing the MCS for various wireless microphones may result in corresponding changes to their operational characteristics (e.g., bit error rate, range, etc.) while maintaining operation using the same number of subcarriers.

As an example, Table 1 below illustrates tradeoffs for an example system according to the present disclosure. As the MCS increases (e.g., moving down on the table), the capacity increases for a constant audio source bit rate, and the operable distance or relative range decreases.

TABLE 1

Audio capacity tradeoffs for Example OFDMA system

| Modulation | Code Rate | Audio Channel Capacity | | | SNR for Y BER | Relative Range |
| --- | --- | --- | --- | --- | --- | --- |
| | | X kbps | 2X kbps | 3X kbps | | |
| QPSK | 1/2 | 10 | 6 | 4 | 6.4 | 1.00 |
| | 3/5 | 12 | 7 | 5 | 7.4 | 0.89 |
| | 2/3 | 14 | 8 | 6 | 8.1 | 0.82 |
| | 3/4 | 16 | 9 | 7 | 8.8 | 0.76 |
| | 5/6 | 16 | 10 | 8 | 9.9 | 0.67 |
| 16-QAM | 1/2 | 20 | 12 | 9 | 12.0 | 0.52 |
| | 3/5 | 24 | 14 | 12 | 13.2 | 0.46 |
| | 2/3 | 26 | 16 | 13 | 13.9 | 0.42 |
| | 3/4 | 30 | 18 | 14 | 15.5 | 0.35 |
| | 5/6 | 32 | 20 | 16 | 16.4 | 0.32 |

FIG. 1 illustrates an example wireless microphone system in which a control device 110 is in communication with a plurality of wireless microphones 120A-120I. Wireless microphones 120A-120I may include any number of different types of microphones and microphone devices (e.g., wireless conference units, body packs, microphones, intercom devices, and more), and may be positioned at various locations within the environment in which the wireless microphone system operates.

In some embodiments, in addition to or in place of the wireless microphones, the system may include one or more other wireless audio devices such as wireless earphones, in-ear wireless monitors, and other audio transducers.

In some examples, the plurality of wireless microphones (and/or other wireless audio devices) may be classified according to various characteristics of the microphones, use cases, applications, and more. For example, one or more of the wireless microphones 120A-120I may be classified as high fidelity audio, voice quality, stereo, mono, or some other classification. Further, one or more of the wireless microphones may be classified as high importance, low importance, or some other ranking. For example, in a concert scenario, a microphone corresponding to the lead singer may be classified as high importance, while a microphone corresponding to a back-up singer may be classified as less important. Example wireless audio systems of the present disclosure may match different classifications to different wireless microphones based on the performance needs, as well as the environmental audio parameters (i.e. operating conditions) in which the system is operating.

In some examples, the classifications of the one or more wireless microphones may be input by a user, in some cases at the time the wireless audio system is set up or configured.

In other cases, one or more of the wireless microphones may be classified automatically by the wireless audio system. For example, all microphones of a certain type may be automatically classified into a particular class as a default, and this default may be overridden based on user input, or the detection of some other information related to a particular wireless microphone.

In some examples, the physical location of one or more wireless microphones can be used to determine the class. For example, an audio user or wireless microphone that is guaranteed to be close to an access point (e.g., the control device 110) can be associated with a classification that is assigned a higher MCS, as compared to more distant users. As another example, users that require a more reliable link can be assigned a lower MCS than users that are more tolerant of link dropouts. Accordingly, overall system capacity can be maximized by not requiring all audio channels to meet the most stringent performance requirements. In some examples, each classification may be assigned a particular MCS, bit rate, bandwidth, or other communication parameter.

Figure 2:
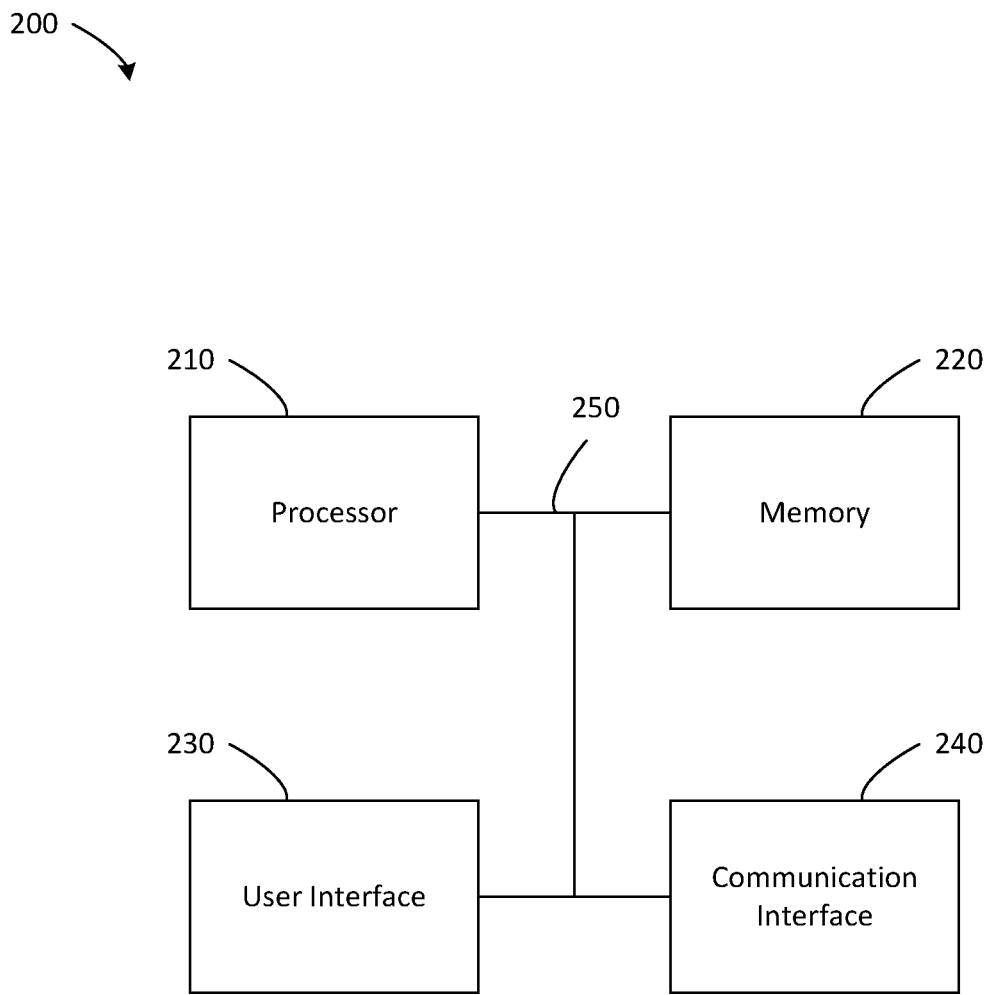
FIG. 2 is a schematic diagram of an example computing device, such as one or more of the wireless microphones and control device of the wireless microphone system of FIG. 1, in accordance with some embodiments.

FIG. 2 illustrates a simplified block diagram of an example computing device 200, according to embodiments of the present disclosure. One or more of the control device 110 and/or wireless microphones 120A-120I may be a computing device such as computing device 200. As such, the control device 110 and/or one or more of the plurality of wireless microphones 120A-120I may include one or more of the components of computing device 200.

Computing device 200 may be configured for performing a variety of functions or acts, such as those described in this disclosure (and accompanying drawings). The computing device 200 may include various components, including for example, a processor 210, memory 220, user interface 230, and communication interface 240, all communicatively coupled by a system bus, network, or other connection mechanism 250. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 200 may be physically remote and may be communicatively coupled to the computing device, via the communication interface 240 for example.

Processor 210 may include a general purpose processor (e.g., a microprocessor) and/or a special purpose processor (e.g., a digital signal processor (DSP)). Processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 220 may be volatile memory (e.g., RAM including non-volatile RAM, magnetic RAM, ferroelectric RAM, etc.), non-volatile memory (e.g., disk memory, FLASH memory, EPROMS, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 220 includes multiple kinds of memory, particularly volatile memory and non-volatile memory.

The memory 220 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 220, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 230 may facilitate interaction with a user of the device. As such, user interface 230 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 230 may also comprise devices that communicate with inputs or outputs, such as a short-range transceiver (RFID, Bluetooth, etc.), a telephonic interface, a cellular communication port, a router, or other types of network communication equipment. The user interface 230 may be internal to the computing device 200, or may be external and connected wirelessly or via connection cable, such as through a universal serial bus port.

Communication interface 240 may be configured to allow the device 200 to communicate with one or more devices (or systems) according to one or more protocols. In one example, the communication interface 240 may be a wired interface, such as an Ethernet interface or a high-definition serial-digital-interface (HD-SDI). As another example, the communication interface 40 may be a wireless interface, such as a cellular, Bluetooth, or Wi-Fi interface. In some examples, the communication interface may include one or more antennas, and may be configured to transmit and receive RF signals.

Data bus 250 may include one or more wires, traces, or other mechanisms for communicatively coupling the processor 210, memory 220, user interface 230, and communication interface 240, and or any other applicable computing device component.

In one embodiment, a wireless microphone system, such as wireless microphone system 100 of FIG. 1, includes a plurality of wireless microphones each classified in accordance with one or more audio quality parameters. As noted above, the audio quality parameters that may be used for classification can include various operation characteristics such as a preferred MCS, bit rate, and/or bandwidth. In addition, the classification can be based on the use case for each of the plurality of microphones (e.g., lead singer, backup singer, proximity to the control device, etc.).

The wireless audio system also includes a control device communicatively coupled to the plurality of wireless microphones. The control device may be configured to determine that a first wireless microphone of the plurality of wireless microphones corresponds to a first audio classification, and that a second wireless microphone of the plurality of wireless microphones corresponds to a second audio classification that is different than the first audio classification. The first and second classifications may be determined based on input from a user interface of the control device (e.g., a user inputs the classification of the one or more wireless microphones), or may be automatically determined based on information corresponding to the plurality of wireless microphones.

The control device may also be configured to determine a first MCS for the first wireless microphone based on the first classification, and determine a second MCS for the second wireless microphone based on the second classification. The first MCS and the second MCS may be the same, or may be different from each other. The control device may then be configured to transmit, to the first and second wireless microphones respectively, the determined first and second MCSs. It should be appreciated that while this example includes two wireless microphones having two different classifications and two MCSs, other wireless microphone systems of the present disclosure may include three or more wireless microphones, three or more different classifications, multiple wireless microphones classified as the same classification, and multiple different MCSs for the different classifications.

In some examples, the control device of the first embodiment is further configured to determine the first and second MCSs for the first and second wireless microphones based on one or more of a priority list of the wireless microphones, a location or position of one or more of the plurality of wireless microphones, the classifications of the plurality of wireless microphones, classifications of wireless microphones in communication with the control device that are not the first or second wireless microphone, a quantity of each classification of the plurality of wireless microphones, a number of channels operable by the control device, and respective bit rates for the channels operable by the control device.

In a second embodiment, the wireless audio system may be similar in one or more respects to the first embodiment. The wireless audio system may include a plurality of wireless microphones each classified in accordance with one or more audio quality parameters. In some examples, the audio quality parameters may include a range of usable modulation and coding schemes, a range of usable bit rates, a desired bit error rate range, and a desired signal-to-noise ratio range. In addition, the classifications can include high fidelity audio wireless microphones, voice grade audio wireless microphones, stereo audio microphones, mono audio microphones, etc. Further, each of these classifications can include sub-classifications (e.g., there may be multiple different classifications within the stereo audio classification).

The wireless microphone system also includes a control device communicatively coupled to the plurality of wireless microphones. In some examples, the control device includes a user interface, and the control device is configured to receive, via the user interface, at least a portion of the audio quality parameters for the plurality of wireless microphones. In this way, a user can input the audio quality parameters and/or the classification of the plurality of wireless microphones.

In some examples, the control device is further configured to determine environmental audio quality parameters for at least one of the plurality of microphones. The environmental audio quality parameters can include a signal strength, distance from the control device, and other characteristics of the communication between the wireless microphone and the control device that are affected by the environment in which the system operates.

The control device may then be configured to determine an MCS for the at least one of the plurality of wireless microphones based on the classification or the environmental audio quality parameters corresponding to the wireless microphone. In some examples, the MCS may be determined based on both the classification and the environmental audio quality parameters. In some examples, the control device is further configured to determine the MCS for the at least one of the plurality of wireless microphones based on one or more of a priority list of the wireless microphones, a location or position of one or more of the plurality of wireless microphones, the classifications of the plurality of wireless microphones, classifications of wireless microphones in communication with the control device other than the at least one wireless microphone, a quantity of each classification of the plurality of wireless microphones, a number of channels operable by the control device, and respective bit rates for the channels operable by the control device.

The control device may then be configured to transmit the determined MCS to the at least one wireless microphone based on the determination of the MCS for the at least one wireless microphone.

In some examples, a bi-directional control channel is used to enable various wireless microphones to access the system and to communicate relevant parameters for the audio channel. The wireless microphone may transmit a bandwidth request to the control device, which may include a desired bit rate. The base station may then computes a bandwidth allocation for the audio user based on configuration settings for MCS, capacity, etc. The wireless microphone is then informed of its assigned bandwidth, MCS, bit rate, etc. via a response message over the control channel.

In some examples, each wireless microphone is granted a persistent bandwidth allocation during network entry. While a given wireless microphone is using its channel, the number of subcarriers allocated, etc. may be kept the same as the initially granted amount. The number of subcarriers allocated may be based on each wireless microphone's preferred audio bit rate and MCS (which may be set at configuration time).

In order for a wireless microphone to gain entry to the wireless audio system, the control device may be configured to receive an access request from the wireless microphone. The access request may include a requested bandwidth (e.g., a requested number of subcarriers) and a requested bit rate. The control device may then determine whether or not there is sufficient open capacity in the wireless audio system to add the wireless microphone.

In some examples, the capacity of the wireless audio system may be determined based on the audio quality parameters of the plurality of wireless microphones, the received access request, and/or the classification of the wireless microphones. As noted above, the wireless audio system may have a nominal capacity of N users, which may increase or decrease depending on the specific parameters of the communication channels (e.g., MCS, bit rate, etc.).

Where it is determined that there is sufficient unused capacity to add a wireless microphone, the control device may be configured to determine a bandwidth allocation (e.g., number of subcarriers), an operable MCS, and an operable bit rate for the wireless microphone. In some examples, the bandwidth allocation (e.g., number of subcarriers) for the wireless microphone may be determined based on the environmental audio quality parameters corresponding to the wireless microphone. After determining the bandwidth allocation, operable MCS, and operable bit rate, this information may be transmitted to the wireless microphone.

If, however, the control device determines that there is not sufficient unused capacity, the control device may deny entry to the wireless microphone that sent the access request. As noted above, in some examples a persistent bandwidth allocation is provided for each wireless microphone (i.e., each has a fixed number of subcarriers). As opposed to a variable number of subcarriers, a fixed number enables fewer or no gaps or dropouts of audio, enables performance requirements that are defined at configuration time to be met, and more.

In some cases, the MCS of one or more wireless microphones operating in the wireless microphone system may be dynamically modified based on one or more factors (such as channel conditions), so as to optimize the performance of the system. In some examples, the system may operate such that a given wireless microphone can have variable parameters (e.g., variable MCS, bit rate, bandwidth), but may not exceed the amount of bandwidth granted during network entry. In some examples, the control device may maintain a table of valid audio bit rate/MCS combinations that are selected based on user measurements specific to each wireless microphone (e.g., packet error rate, signal to noise ratio, etc.). In some examples, the control device may be configured to reduce both the audio bit rate and the MCS of a given wireless microphone when poor channel conditions result in lost packets, and/or increase both the audio bit rate and the MCS (up to preferred bit rate/MCS) when channel conditions improve.

In some examples, the control device may further be configured to determine a set of valid audio bit rates (e.g., a preferred rate and a reduced rate), and a preferred MCS or range of MCSs for each wireless microphone and/or classification. This information may be used to determine the capacity of the system. In some examples, various channel and wireless microphone parameters may be determined after an environmental assessment is performed. For instance, the control device may allocate bandwidth to one or more wireless microphones after scanning the environment to determine where there is interference or other issues. In some examples, determining the environmental conditions and/or scanning the environment may include transmitting data between the control device and one or more wireless microphones, and using this transmitted data (and corresponding signal characteristics) to determine the relevant environmental conditions. For instance, data may be communicated between the control device and a given wireless microphone as the wireless microphone is moved around within the expected operating environment. Based on the detected changes to the data and/or the signal, the amount of interference, packet loss, and/or other signal characteristics may be measured or determined. And then based on the determined interference, packet loss, and/or other signal characteristics, the control device may determine an appropriate bandwidth to allocate to that microphone. Further, the determined interference, packet loss, and/or other signal characteristics determined for that wireless microphone may be used as a basis for the control device to determine the appropriate bandwidth for other similar wireless microphones (e.g., within the same classification), and/or for other dissimilar wireless microphones (e.g., microphones in a different classification, having a different priority, etc.). In one example, the control device determines appropriate measurements for all uplink audio users, while each user device of wireless microphone takes measurements for their own downlink audio. These measurements are then communicated to the control device over a control channel.

In some examples, the control device may be configured to determine that either (1) a bit error rate of a first wireless microphone of the plurality of wireless microphones is outside of a desired bit error rate range (or packet error rate range), or (2) a signal-to-noise ratio of the first wireless microphone of the plurality of wireless microphones is outside of a desired signal to noise ratio range. In this case, the control device may responsively modify the MCS of the first wireless microphone. In one example, a given system may support three different MCS values, including 16-QAM rate 3/4, 16-QAM rate 1/2, and QPSK rate 3/4. Table 2 lists example packet error rate thresholds which would cause the system to increase or decrease the MCS. In this example, a packet error rate (PER) of 1 lost packet per 10 seconds, on average, for a 1 mx frame, would correspond to a PER of 1e-4. Table 3 lists example signal-to-noise ratio thresholds in decibels which would cause the system to increase or decrease the MCS.

TABLE 2

Example Packet Error Rate Thresholds

| MCS | Increase MCS threshold | Decrease MCS threshold |
|---|---|---|
| 16-QAM rate 3/4 | — | 1e-4 PER |
| 16-QAM rate 1/2 | 1e-5 PER | 1e-4 PER |
| QPSK rate 3/4 | 1e-5 PER | — |

TABLE 3

Example Signal-to-Noise Ratio Thresholds

| MCS | Increase MCS threshold | Decrease MCS threshold |
|---|---|---|
| 16-QAM rate 3/4 | — | 26 dB |
| 16-QAM rate 1/2 | 28 dB | 20 dB |
| QPSK rate 3/4 | 22 dB | — |

In particular, where it is determined that the first wireless microphone parameters are outside the ranges such that either (1) the bit error rate (or packet error rate) of the first wireless microphone is above the desired bit error rate range (or packet error rate range) or (2) the signal to-noise ratio of the first wireless microphone is below the desired signal-to-noise ratio range, the control device may be configured to responsively reduce the modulation and coding scheme of the first wireless microphone. Additionally, the control device may be configured to responsively decrease the bit rate when reducing the MCS.

Alternatively, where it is determined that the first wireless microphone parameters are outside the ranges such that either (1) the bit error rate (or packet error rate) of the first wireless microphone is below the desired bit error rate range or (2) the signal to-noise ratio of the first wireless microphone is above the desired signal-to-noise ratio range, the control device may be configured to responsively increase the MCS of the first wireless microphone. Additionally, the control device may be configured to responsively increase the bit rate when increasing the MCS. In some examples, the bit rate scales with the number of information bits per modulation symbol. For example, when switching from QPSK rate 3/4 (1.5 bits/symbol) to 16-QAM rate 1/2 (2 bits/symbol) the bit rate would in theory increase by a factor of 2/1.5=1.33x. However, it should be appreciated that in practice, the scaling factor will not be exactly what is theorized due to overhead, quantization, and the specific bit rates of the audio codecs.

Figure 3:
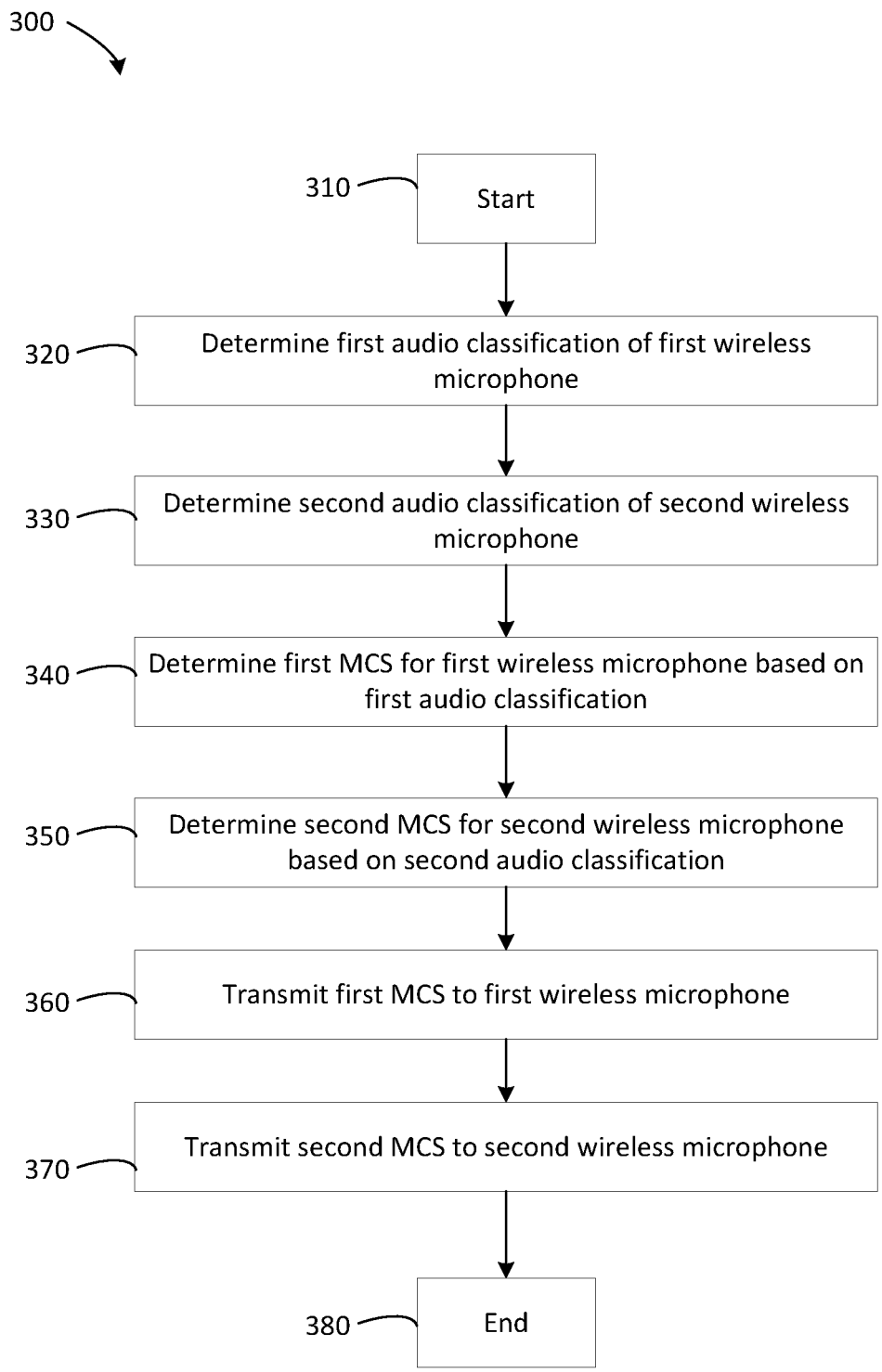
FIG. 3 is a flowchart illustrating a method for operating a wireless microphone system in which two different wireless microphones have two different MCSs.
Figure 4:
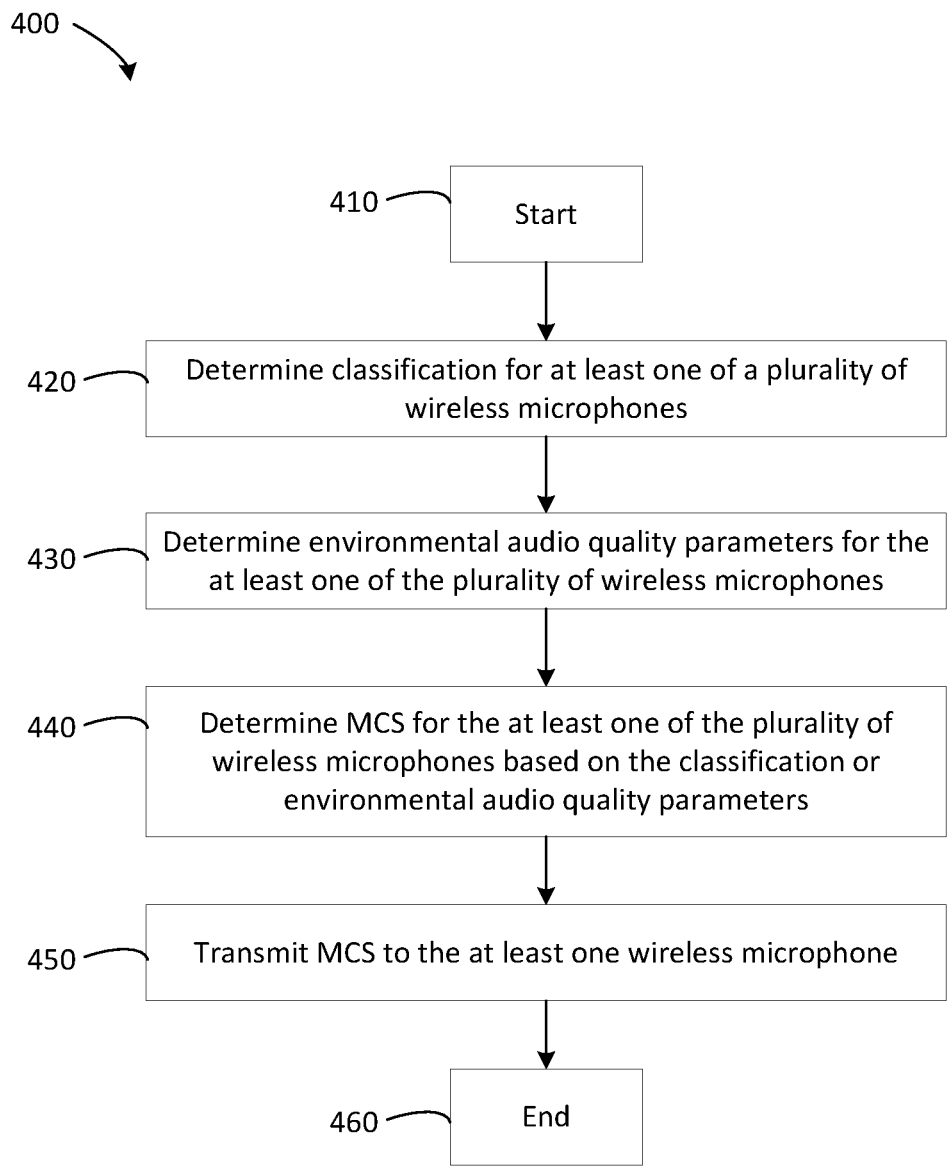
FIG. 4 is a flowchart illustrating a method for operating a wireless microphone system in which a wireless microphone MCS is determined based on a classification or environmental audio quality parameters.
Figure 5:
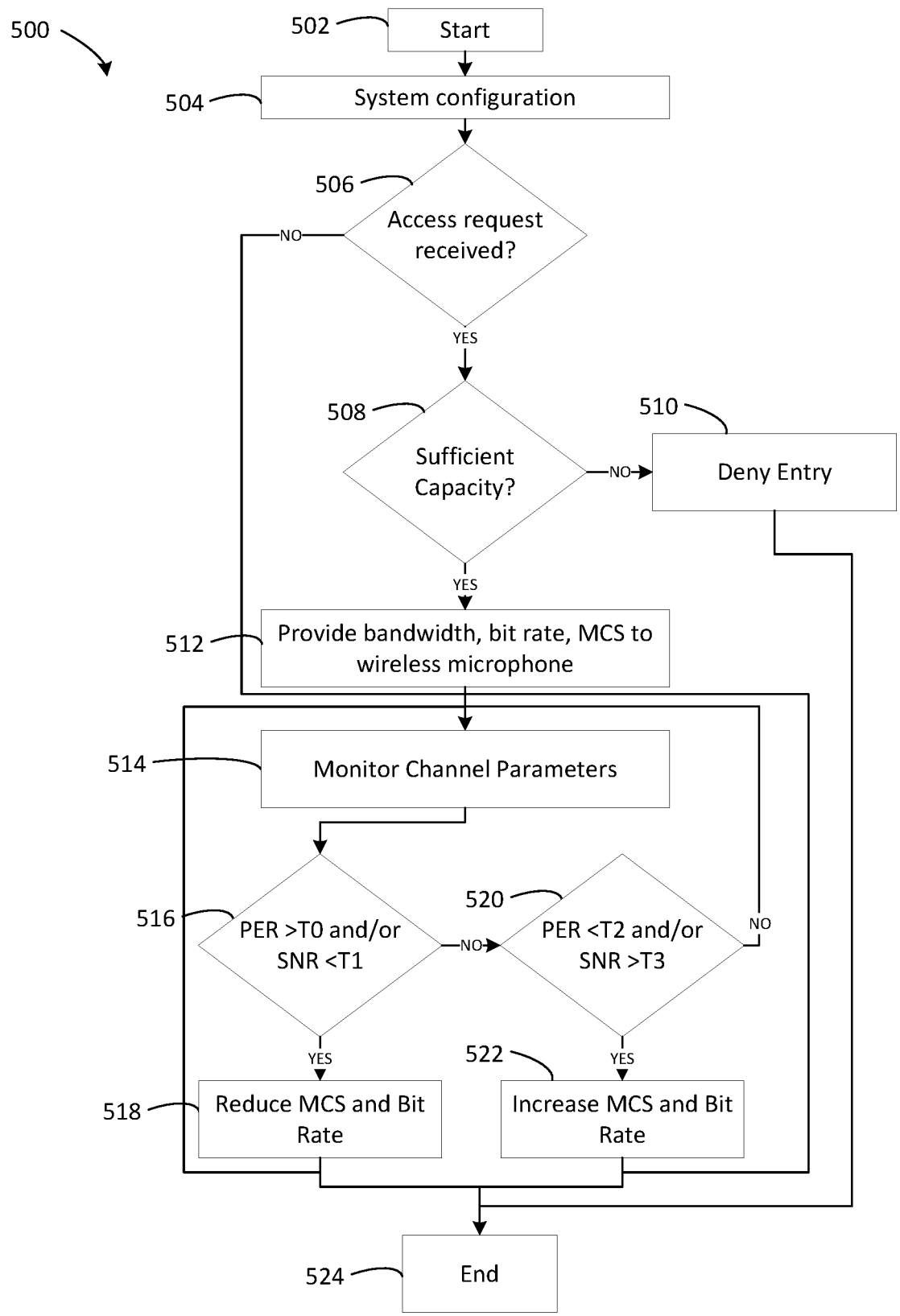
FIG. 5 is a flowchart illustrating a method for adding a wireless microphone to a wireless microphone system, and modifying an MCS of the wireless microphone based on monitored channel parameters.

FIGS. 3, 4, and 5 illustrate flowcharts of various example methods 300, 400, and 500 according to embodiments of the present disclosure. Methods 300 and 400 may enable the determination and transmission of MCSs for various wireless microphones in a wireless microphone system such as the system described in this disclosure. Method 500 may enable the entrance of a wireless microphone into a wireless microphone system, as well as dynamically modify the MCS of the wireless microphone based on monitored channel parameters. The flowcharts of FIGS. 3, 4, and 5 are representative of machine readable instructions that are stored in memory (such as memory 220) and may include one or more programs which, when executed by a processor (such as processor 210) may cause a computing device 200 and/or one or more systems or devices to carry out one or more functions described herein. While the example programs are described with reference to the flowcharts illustrated in FIGS. 3, 4, and 5, many other methods for carrying out the functions described herein may alternatively be used. For example, the order of execution of the blocks may be rearranged or performed in series or parallel with each other, blocks may be changed, eliminated, and/or combined to perform methods 300, 400, and 500. Further, because methods 300, 400, and 500 are disclosed in connection with the components of FIGS. 1-2, some functions of those components will not be described in detail below.

Method 300 may start at block 310. At block 320, method 300 includes determining a first audio classification of a first wireless microphone. This may be done, for example, by a control device such as control device 110 described above. At block 330, method 300 includes determining a second audio classification of a second wireless microphone. The first and second audio classifications may be different from each other, and may be, for example, high fidelity audio, voice quality audio, and others such as those described herein. As noted above, the classifications of the first wireless microphone and the second wireless microphone may be determined based on (1) input from a user (e.g., via a user interface of the control device, or via a separate device communicatively coupled to the control device), (2) a default classification corresponding to the type of wireless microphone, (3) based on the location in which the wireless microphone is used within the environment, (4) based on the operational characteristics of the microphone, and/or any other relevant factors. In one example, microphones may be classified based on whether they support either high fidelity audio or voice-grade audio. The high-fidelity microphones would support higher codec bit rates, may have more robust MCS/MCS threshold values, etc. The voice-grade microphones, on the other hand, may be optimized for capacity, including lower bit rates, more aggressive MCS for a given SNR/PER, etc.

At block 340, method 300 includes determining a first MCS for the first wireless microphone based on the first classification. And at block 350, method 300 includes determining a second MCS for the second wireless microphone based on the second classification. The first MCS and the second MCS may be different from each other. In some examples, the first and second MCSs may be determined solely based on the first and second classifications. In other examples, the first and second MCSs may be determined based on the first and second classifications in addition to other information.

At block 360, method 300 includes transmitting the first MCS to the first wireless microphone, and at block 370 method 300 includes transmitting the second MCS to the second wireless microphone. Each of these transmissions may occur via a control channel message sent from the control device to the individual wireless microphones. Method 300 may then end at block 380.

Method 400 may start at block 410. At block 420, method 400 includes determining a classification for at least one of a plurality of wireless microphones. This classification may be determined based on one or more audio quality parameters, including those input by a user (e.g., a priority list based on intended use of each wireless microphone as either a lead singer, backup singer, etc.).

At block 430, method 400 includes determining environmental audio quality parameters for the at least one of the plurality of wireless microphones. The environmental audio quality parameters may be directly related to the environment in which the system operates, such as interference based on the positioning of the wireless microphone.

At block 440, method 400 includes determining an MCS for the at least one of the plurality of wireless microphones based on the classification or environmental audio quality parameters. In some examples, this may include determining the MCS based on both the classification and the environmental audio quality parameters. Various other information may be considered as well.

At block 450, method 400 includes transmitting the determined MCS to the at least one wireless microphone. Method 400 may then end at block 460.

Method 500 may start at block 502. At block 504, method 500 includes performing a system configuration. As noted above, this can include receiving, via a user interface, various parameters associated with one or more wireless microphones, including the classification of each wireless microphone.

At block 506, method 500 may include determining whether an access request has been received from a wireless microphone requesting to join the wireless audio system. If an access request has been received, method 500 includes determining whether there is sufficient capacity to add the wireless microphone. This can include determining whether there is sufficient capacity at block 508 based on the MCS and bit rates of each of the wireless microphones already present in the system, as well as various information received as a part of the access request.

If there is not sufficient available capacity, method 500 may include denying entry to the wireless microphone requesting to join the wireless audio system at block 510.

If there is sufficient available capacity, method 500 may include providing to the wireless microphone a bandwidth, bit rate, MCS, and other information for the wireless microphone to use at block 512.

At block 514, method 500 includes monitoring channel parameters of one or more of the wireless microphones in the wireless audio system. Blocks 516 and 520 combined comprise determining whether the packet error rate (PER) and signal to noise ratio (SNR) are inside or outside respective ranges defined by the thresholds T0, T1, T2, and T3. In particular, at block 516 method 500 includes determining whether a given wireless microphone has a packet error rate (PER) that is greater than a first PER threshold T0, and/or whether an SNR associated with the wireless microphone is below a first SNR threshold T1. If either of these cases are met (e.g., the error rate is too high, or the SNR is too low), block 518 of method 500 includes reducing the MCS of the wireless microphone.

At block 520, method 500 includes determining whether the wireless microphone has a packet error rate (PER) that is less than a second PER threshold T2, and/or whether an SNR associated with the wireless microphone is above a second SNR threshold T3. If either of these cases are met (e.g., the error rate is lower than necessary, or the SNR is higher than necessary), block 522 of method 500 includes increasing the MCS of the wireless microphone. Method 500 may then continue to monitor channel parameters at block 514. Method 500 may end at block 524.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless microphone system, the system comprising:
a plurality of wireless microphones each classified in accordance with one or more audio quality parameters, wherein each of the plurality of wireless microphones has a respective classification from among a plurality of classifications comprising: a high fidelity audio wireless microphone, a voice grade audio wireless microphone, a stereo audio microphone, or a mono audio microphone; and
a control device communicatively coupled to the plurality of wireless microphones, and configured to:
determine that a first wireless microphone of the plurality of wireless microphones corresponds to a first classification of the plurality of classifications;
determine that a second wireless microphone of the plurality of wireless microphones corresponds to a second classification, of the plurality of classifications, that is different from the first classification;
determine a first modulation and coding scheme for the first wireless microphone based on an audio codec bit rate associated with the first classification;

determine a second modulation and coding scheme for the second wireless microphone based on an audio codec bit rate associated with the second classification; and
transmit, to the first and second wireless microphones respectively, indications of the determined first and second modulation and coding schemes.

2. The wireless microphone system of claim 1, wherein the control device is further configured to determine the first and second modulation and coding schemes for the first and second wireless microphones based on one or more of:
an overall system capacity, a priority list, a location or position of one or more of the plurality of wireless microphones, classifications of the plurality of wireless microphones, a quantity of wireless microphones in each classification, a number of channels operable by the control device, and respective bit rates for the channels operable by the control device.

3. The wireless microphone system of claim 1, wherein the control device comprises a user interface, and wherein the control device is further configured to receive, via the user interface, indications of the first classification and the second classification.

4. The wireless microphone system of claim 1, wherein the control device is further configured to determine the first modulation and coding scheme for the first wireless microphone based on the first classification and an environmental audio quality parameter corresponding to the first wireless microphone.

5. A wireless microphone system, the system comprising:
a plurality of wireless microphones each classified in accordance with one or more audio quality parameters, wherein each of the plurality of wireless microphones has a respective classification from among a plurality of classifications comprising: a high fidelity audio wireless microphone, a voice grade audio wireless microphone, a stereo audio microphone, or a mono audio microphone; and
a control device communicatively coupled to the plurality of wireless microphones, and configured to:
determine a modulation and coding scheme for at least one of the plurality of wireless microphones based on an audio codec bit rate associated with a classification for the at least one of the plurality of wireless microphones; and
transmit, to the at least one of the plurality of wireless microphones, an indication of the determined modulation and coding scheme.

6. The wireless microphone system of claim 5, wherein the audio quality parameters comprise at least one of a range of usable modulation and coding schemes, a range of usable bit rates, a desired bit error rate range, and a desired signal-to-noise ratio range.

7. The wireless microphone system of claim 5, wherein the control device comprises a user interface, and wherein the control device is further configured to receive, via the user interface, an indication of at least a portion of the audio quality parameters for the plurality of wireless microphones.

8. The wireless microphone system of claim 5, wherein the control device is further configured to determine the modulation and coding scheme for the at least one of the plurality of wireless microphones based on a corresponding classification and corresponding environmental audio quality parameters.

9. The wireless microphone system of claim 5, wherein the control device is further configured to:
receive an access request from a first wireless microphone, the access request including a requested bandwidth and a requested bit rate; and
responsive to receiving the access request, the control device is configured to:
determine that there is sufficient capacity to add the first wireless microphone to the wireless microphone system;
determine a first bandwidth allocation, a first modulation and coding scheme, and a first bit rate for the first wireless microphone; and
transmit, to the first wireless microphone, indications of the first bandwidth allocation, the first modulation and coding scheme, and the first bit rate,
wherein transmitting the indications of the first bandwidth allocation, the first modulation and coding scheme, and the first bit rate to the first wireless microphone causes the first wireless microphone to be configured to operate using the first bandwidth allocation, the first modulation and coding scheme, and the first bit rate.

10. The wireless microphone system of claim 9, wherein the capacity is determined based on the audio quality parameters of the plurality of wireless microphones, the received access request, and the classification of the first wireless microphone.

11. The wireless microphone system of claim 9, wherein the control device is further configured to determine the first bandwidth allocation for the first wireless microphone based on environmental audio quality parameters corresponding to the first wireless microphone.

12. The wireless microphone system of claim 5, wherein the control device is further configured to determine the modulation and coding scheme for the at least one of the plurality of wireless microphones based on one or more of:
an overall system capacity, a priority list, a location or position of one or more of the plurality of wireless microphones, classifications of the plurality of wireless microphones, a quantity of wireless microphones in each classification, a number of channels operable by the control device, and respective bit rates for the channels operable by the control device.

13. The wireless microphone system of claim 5, wherein the control device is further configured to:
make a first determination that either: (1) a bit error rate of a first wireless microphone of the plurality of wireless microphones is outside of a desired bit error rate range, or (2) a signal-to-noise ratio of the first wireless microphone of the plurality of wireless microphones is outside of a desired signal-to-noise ratio range; and
modify a first modulation and coding scheme of the first wireless microphone based on the first determination.

14. The wireless microphone system of claim 13, wherein the control device is further configured to:
make a second determination that either: (1) the bit error rate of the first wireless microphone is above the desired bit error rate range or (2) the signal-to-noise ratio of the first wireless microphone is below the desired signal-to-noise ratio range; and
reduce the first modulation and coding scheme of the first wireless microphone based on the second determination.

15. The wireless microphone system of claim 14, wherein the control device is further configured to decrease a bit rate of the first wireless microphone.

16. The wireless microphone system of claim 13, wherein the control device is further configured to:

make a second determination that either: (1) the bit error rate of the first wireless microphone is below the desired bit error rate range or (2) the signal-to-noise ratio of the first wireless microphone is above the desired signal-to-noise ratio range; and increase the first modulation and coding scheme of the first wireless microphone based on the second determination.

17. The wireless microphone system of claim 14, wherein the control device is further configured to increase a bit rate of the first wireless microphone.

18. A method comprising:

determining, by a computing device, classifications for a plurality of wireless audio devices based on one or more audio quality parameters corresponding to the plurality of wireless audio devices, wherein each of the plurality of wireless audio devices has a respective classification from among a plurality of classifications comprising: a high fidelity wireless audio device, a voice grade wireless audio device, a stereo wireless audio device, or a mono wireless audio device;

determining that a first wireless audio device of the plurality of wireless audio devices corresponds to a first classification;

determining that a second wireless audio device of the plurality of wireless audio devices corresponds to a second classification, of the plurality of classifications, that is different from the first classification;

determining a first modulation and coding scheme for the first wireless audio device based on an audio codec bit rate associated with the first classification;

determining a second modulation and coding scheme for the second wireless audio device based on an audio codec bit rate associated with the second classification; and transmitting, to the first and second wireless audio devices respectively, indications of the determined first and second modulation and coding schemes.

19. The method of claim 18, further comprising:

determining the first and second modulation and coding schemes for the first and second wireless audio devices based on one or more of an overall system capacity, a priority list, a location or position of one or more of the plurality of wireless audio devices, classifications of the plurality of wireless audio devices, a quantity of wireless audio devices in each classification, a number of channels operable by the computing device, and respective bit rates for the channels operable by the computing device.

* * * * *